United States Patent [19]

Mohnach

[11] Patent Number: 4,782,547
[45] Date of Patent: Nov. 8, 1988

[54] ATTACHMENT STRUCTURE

[75] Inventor: Michael G. Mohnach, Valpariaso, Ind.

[73] Assignee: The Anderson Company of Indiana, Michigan City, Ind.

[21] Appl. No.: 8,464

[22] Filed: Jan. 29, 1987

[51] Int. Cl.$^4$ ............................................. B60S 1/46
[52] U.S. Cl. ............................... 15/250.04; 15/250.35
[58] Field of Search ........... 15/250.04, 250 A, 250.07, 15/250.35, 250.42, 250.2

[56] References Cited

U.S. PATENT DOCUMENTS

| | | |
|---|---|---|
| 2,798,887 | 7/1957 | Nemic . |
| 3,296,647 | 1/1967 | Gumbleton ..................... 15/250.04 |
| 3,428,992 | 2/1969 | Giorgio ............................ 15/250.04 |
| 3,685,086 | 8/1972 | Frohlich . |
| 3,793,666 | 2/1974 | Brillenburg Wurth . |
| 4,464,808 | 8/1984 | Berry . |

FOREIGN PATENT DOCUMENTS

| | | | |
|---|---|---|---|
| 16651 | 8/1956 | Fed. Rep. of Germany ... | 15/250.04 |
| 2109141 | 10/1970 | France . | |
| 2239875 | 7/1973 | France . | |
| 2513952 | 9/1982 | France . | |
| 2547548 | 6/1983 | France . | |
| 2558125 | 1/1985 | France . | |
| 1332602 | 10/1973 | United Kingdom ............... | 15/250.2 |
| 2106775 | 4/1983 | United Kingdom ............. | 15/250.42 |

Primary Examiner—Peter Feldman
Attorney, Agent, or Firm—Wood, Dalton, Phillips, Mason & Rowe

[57] ABSTRACT

According to the invention, an attachment structure is provided and has a body with a configuration for connection to a wiper arm. The attachment structure may have one or any combination of an airfoil, a washer fluid conduit or receptacle or an air dam integrally formed on or carried by the body. The attachment structure is elongate and may have an airfoil, an air dam and/or a washer fluid conduit or receptacle integrally formed on the body and will extend lengthwise of the wiper arm in assembled relationship therewith. The cross-sectional configuration of the body and wiper arm is substantially uniform throughout the length of the structure. Because extrusion molding is cheaper than injection molding, a high integrity, plastic device can be produced at a lower cost than conventional injection molded structures.

17 Claims, 2 Drawing Sheets

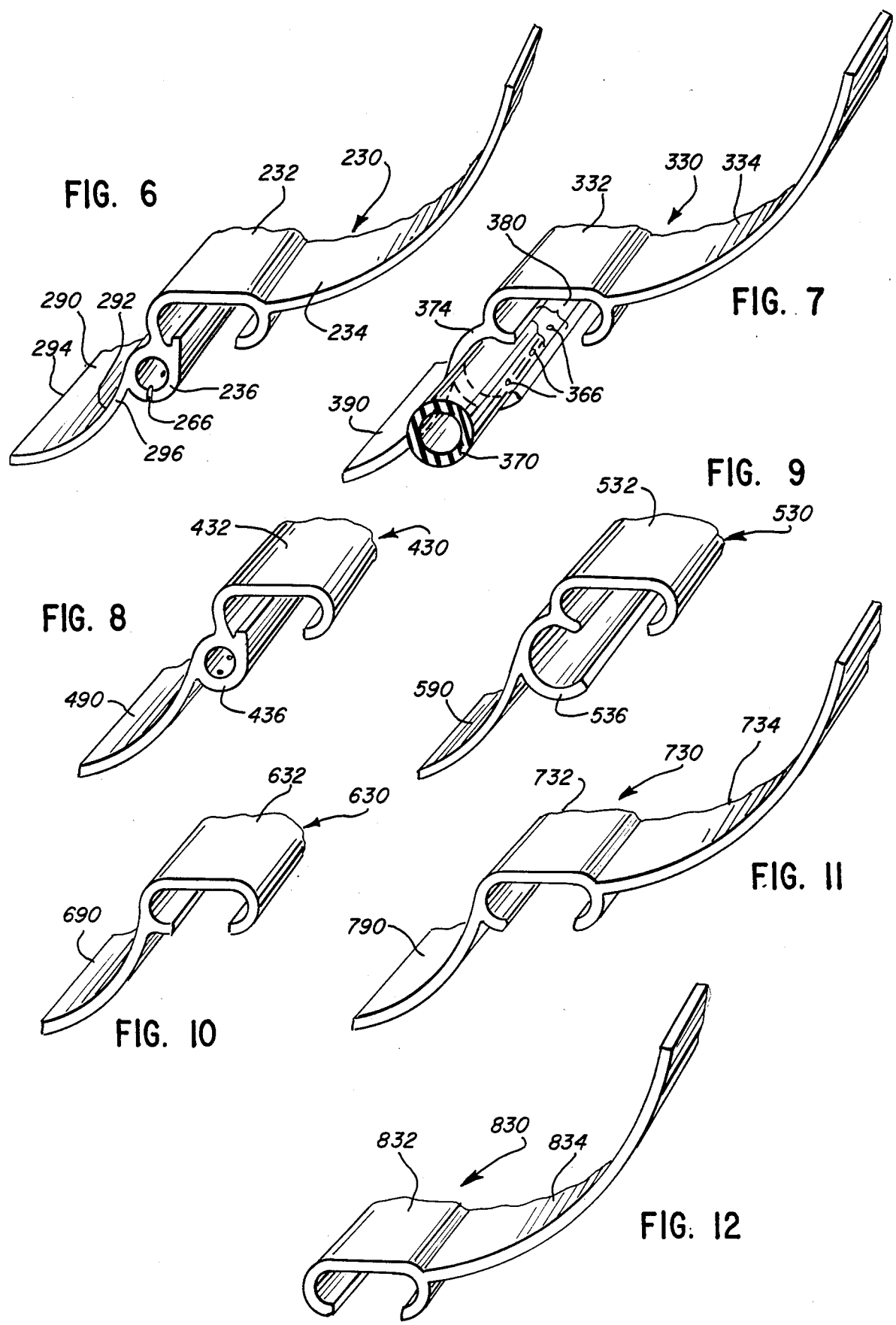

ATTACHMENT STRUCTURE

BACKGROUND OF THE INVENTION

1. Field of the Invention

This invention relates to windshield wipers and, more particularly, to an attachment structure for attachment to a wiper arm for holding a windshield wiper blade against the windshield, for facilitating efficient delivery of a cleaning fluid against a windshield surface and for deflecting an air stream away from a superstructure of a wiper blade.

2. Background Art

It is known to attach structures defining airfoils to a windshield wiper arm assembly to alter air flow characteristics such as shown by U.S. Pat. No. 2,799,887 to Nemic. Another known structure is shown in U.S. Pat. No. 3,793,666 to Wurth and has a deflector which protects the liquid nozzles of a washer fluid dispenser against the vehicle slipstream. In the Wurth structure, a disk-shaped deflector is attached to a wiper arm. The principal drawback with such a structure is that the shape of the airfoil necessitates formation by injection molding, the tooling for which is relatively costly as, for example, compared to extrusion molding.

Another feature of the Wurth structure is the formation of a receptacle for a fluid delivery conduit, which is wrapped around the disk defining the deflector. One apparent problem with this structure is that the ports in the conduit, which is flexible, may not consistently orient for a desired distribution of the cleaning fluid over the windshield. Proper assembly involves the consistent wrapping of the conduit around the disk, which generally cannot be assured and which becomes tedious and time consuming.

A still further drawback with the Wurth structure is that the deflector structure must be bolted in place on the wiper arm. This is inherently complicated, time-consuming and costly both from a manufacturing and assembly standpoint.

The present invention is specifically directed to overcoming the above-enumerated problems in a novel and simple manner.

SUMMARY OF THE INVENTION

According to the invention, an extruded attachment structure is provided for a windshield wiper arm and in one form has a combination body, for connection to a wiper arm, and airfoil so configured that the body and airfoil can be readily formed by an extrusion molding process. In one preferred form, the body and airfoil are elongate and align lengthwise with the wiper arm in assembled relationship therewith. The cross-sectional configuration of the body and wiper arm is substantially constant throughout the length of the structure. Because the extrusion molding process is cheaper than injection molding, a high integrity, plastic device can be produced at a lower cost than conventional injection molded structures.

Another aspect of the invention is the formation of the attachment so that the body can be snap-fit into place on the wiper arm. To accomplish this, the cross section of the body has an inverted substantially U-shape with the free ends of the legs of the U inturned so as to be capable of being drawn about and snap-fit to a wiper arm.

A still further aspect of the invention is the integral formation of a cleaning fluid delivery conduit with the body and airfoil. The conduit preferably has a constant cross-sectional configuration throughout its length and thus can also be extrusion molded as an integral part of the body and airfoil. With the conduit integrally formed, consistent orientation of the ports for delivery of a cleaning fluid against a windshield surface can be assured.

A further aspect of the invention is the elongate airfoil structure formed in substantial continuation of the body and of a uniform size and shape as to receive and deflect a portion of the air stream sweeping across the hood and windshield particularly at higher speeds to hold the wiper blade attached to the wiper arm in wiping relationship on the windshield and at the same time shield the ports in the delivery conduit producing an improved distribution of fluid onto the windshield surface.

As an alternative to the formation of an integral cleaning fluid delivery conduit, a hose or conduit receiving receptacle can be formed with the body along the length thereof and serves to readily secure a conventional conduit.

Another aspect of the invention is an elongate air dam integrally formed either directly on the body or directly on the fluid delivery conduit (or receptacle). The air dam may extend either downwardly or downwardly and forwardly of the body to a location fairly close to the windshield surface to protect the wiper blade and wiper blade superstructure from the direct sweep of air flowing in close proximity to the surface of the windshield. The air dam deflects the air upwardly and away from the wiper blade.

And still another aspect of the invention is an attachment for a wiper arm that includes various combinations of airfoils, air dams and/or fluid delivery conduits (self-contained or in receptacle form) carried on the attachment body which body is removably attached to the wiper arm.

BRIEF DESCRIPTION OF THE DRAWINGS

FIG. 6 is still another form of the invention showing an air dam integrally formed on the fluid delivery structure of FIGS. 1–4;

FIG. 7 is another form of the invention showing an air dam integrally formed on the fluid delivery structure of FIG. 5;

FIG. 8 is a further form of the invention showing an air dam on the fluid delivery structure carried by the attachment body;

FIG. 9 is a form of the invention similar to FIG. 8 only with the alternative cleaning fluid delivery structure of FIG. 5;

FIG. 10 is a form of the invention having the air dam carried directly by the attachment body;

FIG. 11 is a form of the invention having the air dam directly on the attachment body along with the airfoil; and FIG. 12 is another form of the invention having the airfoil on the attachment body.

BRIEF DESCRIPTION OF THE PREFERRED EMBODIMENTS

Figure 1:
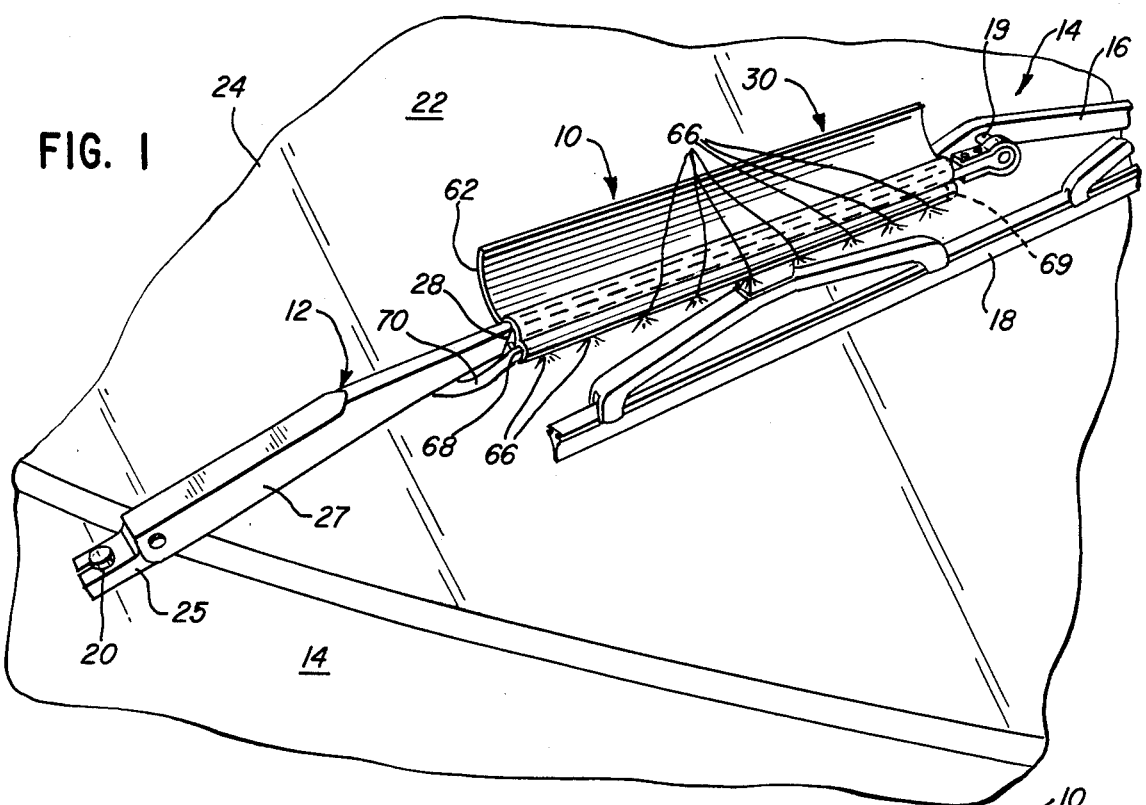
FIG. 1 is a perspective view of a windshield wiping structure with an attachment structure for a wiper arm having an attaching body with a combination airfoil and cleaning fluid delivery structure according to one preferred form of the present invention.

In FIG. 1, in brief, shows a windshield wiper assembly 10 comprised of a windshield wiper arm 12 and a windshield wiper blade 14. The wiper blade 14 includes an articulated superstructure 16 and a resilient wiping element 18. The wiper blade 14 pivots with respect to the arm 12 about a connector pin 19 extending from the arm. The wiper arm 12 of the assembly is mounted on a pivot shaft 20 extending outwardly from the vehicle adjacent the vehicle window 22 to be wiped (such as a windshield). The wiper assembly 10 and pivot shaft 20 are oscillatably driven by a wiper motor (not shown) for moving the resilient wiping element 18 of the wiper blade 14 across the surface 24 of the windshield.

Figure 2:
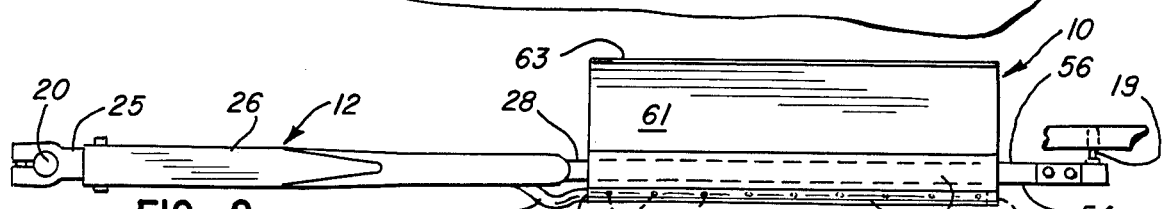
FIG. 2 is a plan view of the wiper arm of the windshield wiping structure of FIG. 1 with the inventive attachment secured thereto.
Figure 3:
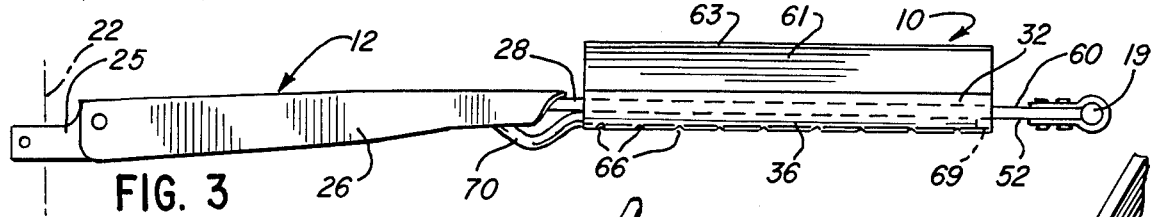
FIG. 3 is a side elevation view of the wiper arm and the inventive attachment of FIG. 2.

As seen in FIGS. 1-3, the wiper arm 12 is conventional and has a mounting portion 25, has a channel shaped portion 26 (enclosing a spring, not shown), and an arm extension 28 remote from the mounting portion 25. The arm extension 28 is substantially rectangular and uniform in cross section.

As seen in FIGS. 1-4, one preferred form of attachment structure 30 is illustrated and comprises a body 32, an airfoil 34 and a cleaning fluid delivery conduit 36 integrally formed with the body 32. Preferably, the entire attachment structure 30 is formed from plastic using an extrusion process.

The body 32 has an inverted substantially U-shape in cross section, transverse to its length, and has spaced legs 38, 40, with the latter leg 40 having an inturned free end 42. The conduit 36 has an integral wall 44 defining an elongate surface 46 facing the base 48 of the body 32. The legs 38, 40, inturned end 42, base 48, and wall surface 46 cooperatively define a receptacle for the wiper arm extension 28.

Assembly of the attachment structure 30 is accomplished by first tilting the body 32 so that the edge 54 of the extension 28 can be introduced into the space 50 between the inturned free end 42 of leg 40 and wall 44 of conduit 36. The underside 52 of section 28 is moved transverse to the opening 50 along surface 46 until edge 54 on section 28 is immediately adjacent the body leg 38. The leg 40 is then urged downwardly over the side surface 56 opposite the surface 54 on the section 28. The free end 42 of leg 40 deforms to permit passage of the section and upon the underside 58 of base 48 making facial engagement with the upwardly facing surface 60 of the section 28, the free end 42 springs back so that the section 28 of the arm 12 is securely captured by the body 32.

The airfoil 34 is a curved extension of the body 32 and defines a concave surface 61 facing forward of the airfoil when assembled on the wiper arm extension and defines a convex surface 62 that faces the windshield surface 24. With the vehicle in motion, air strikes the concave surface 61 and is deflected upward and away from the trailing edge 63 of the airfoil to create turbulence and a low pressure region between the convex surface 62 and the windshield thereby causing the cleaning fluid issuing from ports in the delivery conduit 36 to be directed towards the windshield surface 24 in a substantially uniform manner. The deflection of the air stream by the concave surface 61 of the airfoil urges the airfoil 34, attached wiper arm 12 and the wiper blade 14 toward the windshield whereby the wiping element 18 makes better contact with the windshield for cleaning same.

Cleaning fluid delivery to the windshield 22 is accomplished through conduit 36 integrally formed as part of the attachment structure and, which defines an internal fluid passageway 64. The conduit 36 extends the entire length of the attachment structure 30 and has regularly spaced ports 66 in communication with the passageway 64 to direct the cleaning fluid in a desired pattern against the windshield surface 24. The precise number and spacing of the ports 66 is principally a design consideration. The conduit 36 has an inlet end 68, which accepts a connection with a cleaning fluid delivery hose 70, that conveys the cleaning fluid from a supply (not shown) to the conduit 36. A plug 69 is seated in the remote end of the conduit 36 so that all fluid is directed through the ports 66. As the fluid issues from the ports 66 the air turbulence and the slightly reduced air pressure between the airfoil and the windshield permits the fluid to wet the windshield and spread out ahead of the sweep of the wiper blade.

The body 32, airfoil 34 and conduit 36 have a uniform cross-sectional configuration transverse to the length of the attachment structure 30. Accordingly, the structure lends itself to formation by extrusion molding. Because the tooling for extrusion molding is substantially less expensive than that required for injection molding, the structure 30 can be economically formed from plastic. The attachment structure 30 is simply snap-fit to the wiper arm, which facilitates assembly, and is consistently oriented by reason of its cooperation with the wiper arm extension 28. Since the cross-section of the arm extension 28 is uniform the attachment structure 30 of FIGS. 1-4 having the airfoil 34 and washer fluid structure 36 can be snap fit on the arm with the airfoil pointing in the proper direction depending on the orientation of the wiper arm on the windshield. At the same time, the orientation of the ports 66 is predictable so that a desired delivery pattern for the cleaning fluid can be consistently assured.

Figures 4, 5:
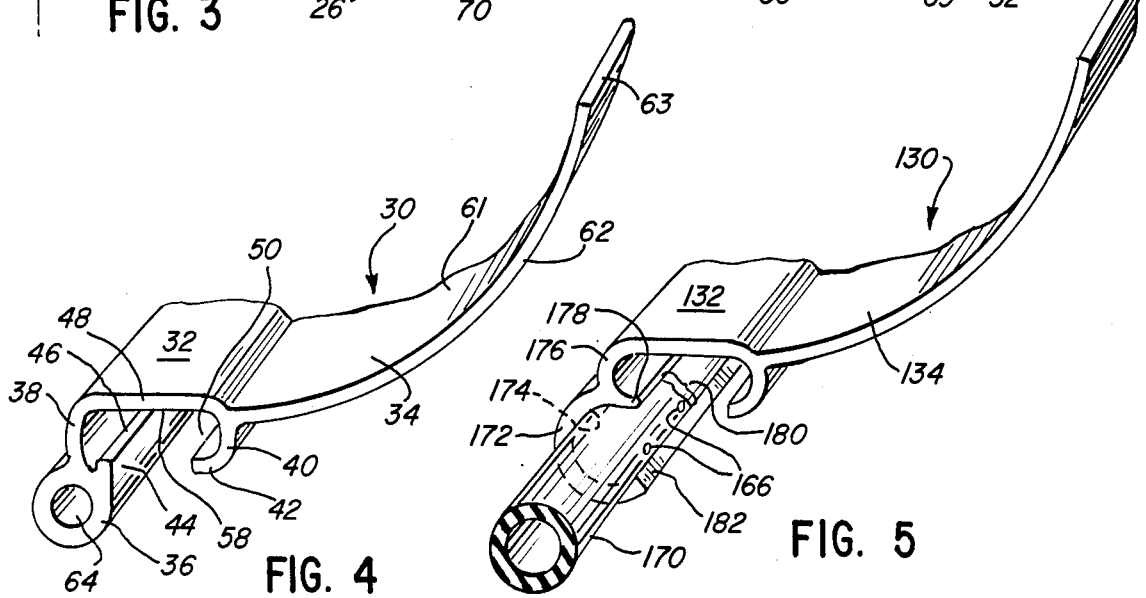
FIG. 4 is an enlarged, fragmentary, perspective view of the airfoil and cleaning fluid delivery structure of the one preferred form of the invention of FIGS. 1–3.
FIG. 5 is a view similar to that in FIG. 4 and showing another preferred form of attachment wherein an airfoil and an alternative form of cleaning fluid delivery structure is carried by the attachment body.

An alternative form of the inventive attachment structure is shown at 130 in FIG. 5. The attachment structure 130 comprises a body 132 and integral airfoil 134 as in the prior embodiment. The body 132 is also snap-fit to the wiper arm extension 28 in similar fashion.

The distinction resides in the provision of a receptacle 172 for a hose 170, a short piece of which is shown in FIG. 5, in place of the self contained conduit 36 in the prior embodiment. The receptacle 172 has a curved configuration and defines a seat 174 for a conventional hose 170, having ports 166 therein for delivery of washer fluid. One leg 176 of the body 132 has an inturned portion 178 defining a restricted opening 180 in conjunction with a free edge 182 of the receptacle 172. A flexible or rigid hose 170 with ports 166 therein can thus be squeezed into the seat 174. The hose 170 (shown in FIG. 5) and/or the receptacle 172 will deform to allow the hose 170 to be locked into place in the seat 174. The ports 166 are directed in a direction beneath the airfoil 134 so that the turbulence and slightly reduced pressure between the airfoil and the windshield will aid in distributing the washing fluid on the surface to be wiped.

The structure in FIG. 5 also has a constant cross-sectional configuration throughout its length and thus is capable of being extrusion molded as in the prior embodiment. In each embodiment, a desired length of the airfoil and washer structure can simply be cut off a length of extruded stock.

FIG. 6 shows another modified form of attachment structure 230 having a body 232 for snap fitting the attachment 230 to the extension of the wiper arm (not shown in FIG. 6). An airfoil 234 and washer fluid conduit 236 are formed integral with the body 232, the same as in FIGS. 1-4. An air dam member 290 is integrally formed with and runs the full length of the washer fluid conduit 236. The air dam 290 has a concave forward facing surface 292 with a leading edge 294 downwardly of and forwardly of the body 232. The air dam 290 has its root 296 connected to the washer fluid conduit 236 with the concave surface merging in a tangent with the curvature of the washer fluid conduit 236. In practice, the air dam 290, with the attachment structure 230 attached to the wiper arm, will extend downwardly and forwardly of the body 232 in a position forward of the superstructure 16 and wiping element 18 of the wiper blade. The leading edge 294 of the air dam will be close to but not in contact with the surface 24 of the window 22. The air dam 290 will shield the portion of the wiper blade that lies behind it from receiving the full blast of the air stream flowing from the surface of the vehicle and from the surface of the window (in this case the windshield) particularly in windy areas and/or at moderate or high speed operation of the vehicle. The air dam 290 baffles the air away from the blade so that the blade can better perform its function of cleaning the windshield. The air foil 230 functions as described above with respect to FIGS. 1-4 serving to use wind force to urge the blade toward the windshield and to create a slight reduced pressure and turbulence on the convex, underside of the airfoil to better distribute the washing fluid issuing from the ports 266 in the conduit 236 onto the surface of the windshield.

The FIG. 7 attachment structure 330 is similar to FIG. 5 in all respects except that it has an air dam 390 integrally formed with the washer hose receptacle 374. The attachment structure 330 has a body 332, an airfoil 334 and the hose receptacle 374 along with the air dam 390 all formed as one piece by extrusion molding. The cross-section of the attachment structure 330 is uniform throughout its length. The attachment structure 330 is attached to a wiper arm and operates in the same manner as FIG. 6 except that a hose 370 is seated in the receptacle 374 with fluid ports pointing out through the mouth 380 of the receptacle as described with respect to FIG. 5.

FIG. 8 shows an attachment structure 430 having a body 432, a washer fluid conduit 436 and an air dam 490 integrally formed with the washer fluid conduit 436. FIG. 9 shows an attachment structure 530 having a body 532, a washer fluid receptacle 536 and an air dam 590 integrally formed with the washer fluid receptacle 536. FIG. 10 shows an attachment structure 630 having a body 632 and an air dam 690 integrally formed directly on the body 632. FIG. 11 shows an attachment structure 730 having a body 732, an airfoil 734 and an air dam 790 integrally formed directly on the body 732. And FIG. 12 shows an attachment structure 830 having a body 832 and an airfoil 834 integrally formed directly on the body 832.

Each of the embodiments shown in FIGS. 8-11, inclusive, teach attachment structures having a body together with various combinations of washer fluid conduits or receptacles and/or airfoils with FIG. 12 teaching only an airfoil integrally formed on the body of the attachment structure. As described with respect to FIGS. 1-5, the body of the attachment structure is for securing the structure to a wiper arm, the airfoil is for urging the wiper blade toward the windshield and to create a reduced pressure and turbulence between the airfoil and the windshield to better distribute and wet the surface of the windshield, and the washer fluid conduit or receptacle is for dispensing washing fluid onto the surface of the windshield. As described with respect to FIGS. 6 and 7, the air dam is for deflecting the air stream from hitting the wiper blade full force during a wiping sweep by the wiper blade assembly. Each element of the several described attachment structures functions as set out. That is, various combinations of one or more of the airfoils, washer fluid conduits or receptacles and air dams together with the body produces the improved results set forth for that one or more features.

I claim:

1. An attachment structure for connection to a windshield wiper arm, said structure comprising:
a body;
means on the body defining an airfoil to vary air flow characteristics in front of a windshield surface adjacent to which the wiper arm is attached;
conduit means integral with the body and defining a fluid passageway alongside said body,
said conduit means having an inlet opening for introducing a windshield cleaning fluid into the fluid passageway and at least one discharge opening for directing cleaning fluid from the passageway against a windshield; and
means for snap-fitting a substantial length of the body directly against and to a windshield wiper arm.

2. The attachment structure according to claim 1 and having an air dam integrally formed on the conduit means and projecting downwardly and outwardly of the body on the opposite side of the body from the airfoil.

3. The attachment structure according to claim 2 wherein said structure is elongate and the cross-section of the structure is substantially uniform throughout its length.

4. The attachment structure according to claim 2 wherein said structure is a single, extruded plastic piece.

5. An attachment structure for connection to a windshield wiper arm, said structure comprising:
a body;
an airfoil integrally formed on said body to vary the air flow characteristics in front of a windshield surface adjacent to which the wiper arm is attached;
conduit means integral with the body and defining a fluid passageway alongside said body,
said conduit means having an inlet opening for introducing a windshield cleaning fluid into the fluid passageway and at least one discharge opening for directing cleaning fluid from the passageway against a windshield; and
means for snap-fitting a substantial length of the body directly against and to a windshield wiper arm.

6. The attachment structure according to claim 5 wherein the connecting means comprises a generally inverted U-shaped portion on the body with flexible legs on the U-shaped portion having inturned free ends for engaging a wiper arm.

7. The attachment structure of claim 5 wherein the airfoil extends generally upwardly and away from the body.

8. The attachment structure of claim 5 wherein an air dam is integrally formed on said body and extends generally downwardly and away from the body.

9. The attachment structure according to claim 5 wherein the structure is a single, extruded plastic piece.

10. An attachment structure for connection to a windshield wiper arm, said structure comprising:
   a body having a length;
   an airfoil integrally formed on said body to vary airflow characteristics in front of a windshield surface adjacent to which the wiper arm is attached;
   receiving means integrally formed with the body for retaining therein a conduit alongside the body for delivering a cleaning fluid towards a windshield surface,
   said receiving means having a substantially uniform cross-sectional configuration throughout the length of the body; and
   means for snap-fitting the body directly against said to a windshield wiper arm;
   said attachment structure consisting of a single piece.

11. The attachment structure according to claim 10 wherein the airfoil is formed on said body and arranged so that a low pressure region is created thereby adjacent to the surface of the windshield so that cleaning fluid delivered from the conduit wets a windshield surface to be wiped.

12. The attachment structure according to claim 11 wherein said structure is a single, extruded plastic piece.

13. The attachment structure claim 11 wherein an air dam is integrally formed on said body and extends generally downwardly and away from the body.

14. The attachment structure according to claim 13 wherein the body, the receiving means, the airfoil and the air dam have a substantially uniform cross sectional configuration transverse to the length of the body.

15. An attachment structure for connection to a windshield wiper arm, said structure having an elongate body for connection to a wiper arm and an integral airfoil on the body, the improvement comprising:
   said body and airfoil having a substantially constant cross-sectional configuration transverse to the length of the body,
   whereby the integral body and airfoil can be readily formed by extrusion molding;
   an air dam means integrally formed on said body and projecting generally downwardly from said body so as to deflect an air stream flowing along the surface of the windshield upward and away from a wiper blade carried by the wiper arm; and
   a fluid delivery means integrally formed on said body and extending the length of said body for spraying fluid onto the windshield between the airfoil and the windshield.

16. The attachment of claim 15 wherein an air dam means is formed integrally with the fluid delivery means and projects generally downwardly from said delivery means.

17. An attachment structure for connection to a wiper arm wherein said wiper arm operatively supports a wiper blade in wiping contact with a windshield of a vehicle, the improvement comprising:
   a body having means for connecting the attachment means to the wiper arm;
   an air dam means integrally formed on and extending generally downwardly and forwardly of said body for deflecting an air stream flowing past the windshield upward and away from the wiper blade carried by said wiper arm;
   an airfoil integrally formed on said body and projections generally upwardly and rearwardly from said body, said airfoil being arranged on said body to be struck by said air stream to urge said wiper arm and blade toward the windshield; and
   a washer fluid means integrally formed on said body between said body and said air dam means for discharging fluid between said airfoil and said windshield;
   said airfoil creating turbulence between said airfoil and said windshield to assist the washer fluid in wetting the windshield surface to be wiped.

* * * * *